(12) United States Patent
Kobayashi et al.

(10) Patent No.: US 7,633,479 B2
(45) Date of Patent: Dec. 15, 2009

(54) ACTIVE MATRIX LIQUID CRYSTAL DISPLAY DEVICE

(75) Inventors: Mitsugu Kobayashi, Nagoya (JP); Kenji Saiki, Gifu (JP); Seiji Matsuda, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 636 days.

(21) Appl. No.: 11/074,943

(22) Filed: Mar. 9, 2005

(65) Prior Publication Data

US 2005/0200561 A1   Sep. 15, 2005

(30) Foreign Application Priority Data

Mar. 10, 2004   (JP) ............................. 2004-067866

(51) Int. Cl.
*G09G 3/36* (2006.01)
(52) U.S. Cl. .......................................... 345/96; 345/55
(58) Field of Classification Search ................... 345/96, 345/209, 55
See application file for complete search history.

(56) References Cited

U.S. PATENT DOCUMENTS

| | | | |
|---|---|---|---|
| 7,088,328 B2 * | 8/2006 | Inada et al. ................... | 345/96 |
| 2003/0174113 A1 * | 9/2003 | Herrmann .................... | 345/96 |

FOREIGN PATENT DOCUMENTS

| | | | |
|---|---|---|---|
| EP | 0704906 A2 | 4/1996 | |
| JP | 2003-150127 | 5/2003 | |

OTHER PUBLICATIONS

H. Dossal et al. (1991) "A Planar Varactor Diode for Harmonic Generation at Gigahertz Frequencies," IEEE pp. 968-972.
William L. Bishop et al. (1987) "A Novel Whiskerless Schottky Diode for Millimeter and Submillimeter Wave Application," IEEE pp. 607-610.
M. Senda et al. (2004) "New Dot-Inversion Driving Method for Low Power Consumption LTPS TFT LCDS," 2004 SID International Symposium Digest of Technical Papers 35(2), pp. 976-979.
European Search Report mailed Aug. 10, 2005, directed to EP Application 05009234.5.

* cited by examiner

*Primary Examiner*—Kevin M. Nguyen
*Assistant Examiner*—Kenneth B Lee, Jr.
(74) *Attorney, Agent, or Firm*—Morrison & Foerster LLP

(57) ABSTRACT

The first output buffer 22 of the driving LSI 20 outputs the first video signal voltage V and the second output buffer outputs the second video signal voltage *V with the opposite polarity from that of the first video signal voltage. The first and the second video signal voltages V, *V are fed to the drain driver 2 of the display panel 1 through a pair of signal wirings. The drain driver 2 supplies the first video signal voltage V to a pixel and the second video signal voltage with the opposite polarity to the pixel adjacent to the fist pixel through the drain line 5 and the TFT9. In this way, any pair of the adjacent pixels in horizontal and vertical direction receives the video signal voltages with opposite polarities from each other.

4 Claims, 9 Drawing Sheets pixel potential Vp ( the first pixel GS1 )

pixel potential Vp ( the second pixel GS2 )

ACTIVE MATRIX LIQUID CRYSTAL DISPLAY DEVICE

CROSS-REFERENCE OF THE INVENTION

This invention is based on Japanese Patent Application No. 2004-067866, the content of which is incorporated herein by reference in its entirety.

BACKGROUND OF THE INVENTION

1. Field of Invention

This invention relates to an active matrix display device.

2. Description of Related Art

The deterioration of liquid crystal is prevented by the common AC driving that gives AC potential to a common electrode and a supplemental capacitance in the active matrix display device where an image signal is applied to a pixel electrode through a switching element such as a thin film transistor (TFT). Also, low energy consumption is achieved by lowering both electric current and voltage of a drain driver through the minimization of the voltage difference between the positive and negative polarities of video signal inputted to the drain driver. The voltage polarity of the common electrode and all the supplemental capacitance lines is inverted at each horizontal period in a line inversion driving system where polarity of the video signal given to the drain line is inverted at each horizontal period during the common AC driving.

The Japanese patent publication 2003-150127 discloses the common DC dot inversion driving system, in which the video voltages with opposite polarities are applied to the pixels in such way that any pair of the adjacent pixels in horizontal and vertical direction have opposite polarity from each other by supplying the video voltage with opposite polarities to the pixel electrodes next to each other in gate line direction with the voltage Vcom of the common electrode potential as the DC potential.

However, line-flicker easily appears in the line inversion driving system, deteriorating the display quality. Although the common DC dot inversion driving system can achieve the high quality display since it does not cause line-flicker, its energy consumption is large because of the wider dynamic range of the video signals V, V* (signal V* signifies the signal with the opposite polarity from that of signal V) as shown in FIG. 12.

SUMMARY OF THE INVENTION

The invention provides an active matrix display device that includes a plurality of a first pixel electrodes and a plurality of a second pixel electrodes. Each of the second pixel electrodes is disposed adjacent a corresponding first pixel electrode. The device also includes a signal processing circuit outputting a composite video signal having a first video signal and a second video signal that has a polarity opposite from a polarity of the fist video signal. The dynamic range of the composite video signal is not larger than the sum of the dynamic range of the first video signal and the dynamic range of the second video signal. The device further includes a driver circuit supplying the first video signal to the first pixel electrodes and the second vide signal to the second pixel electrodes.

DETAILED DESCRIPTION OF THE INVENTION

Figure 1:
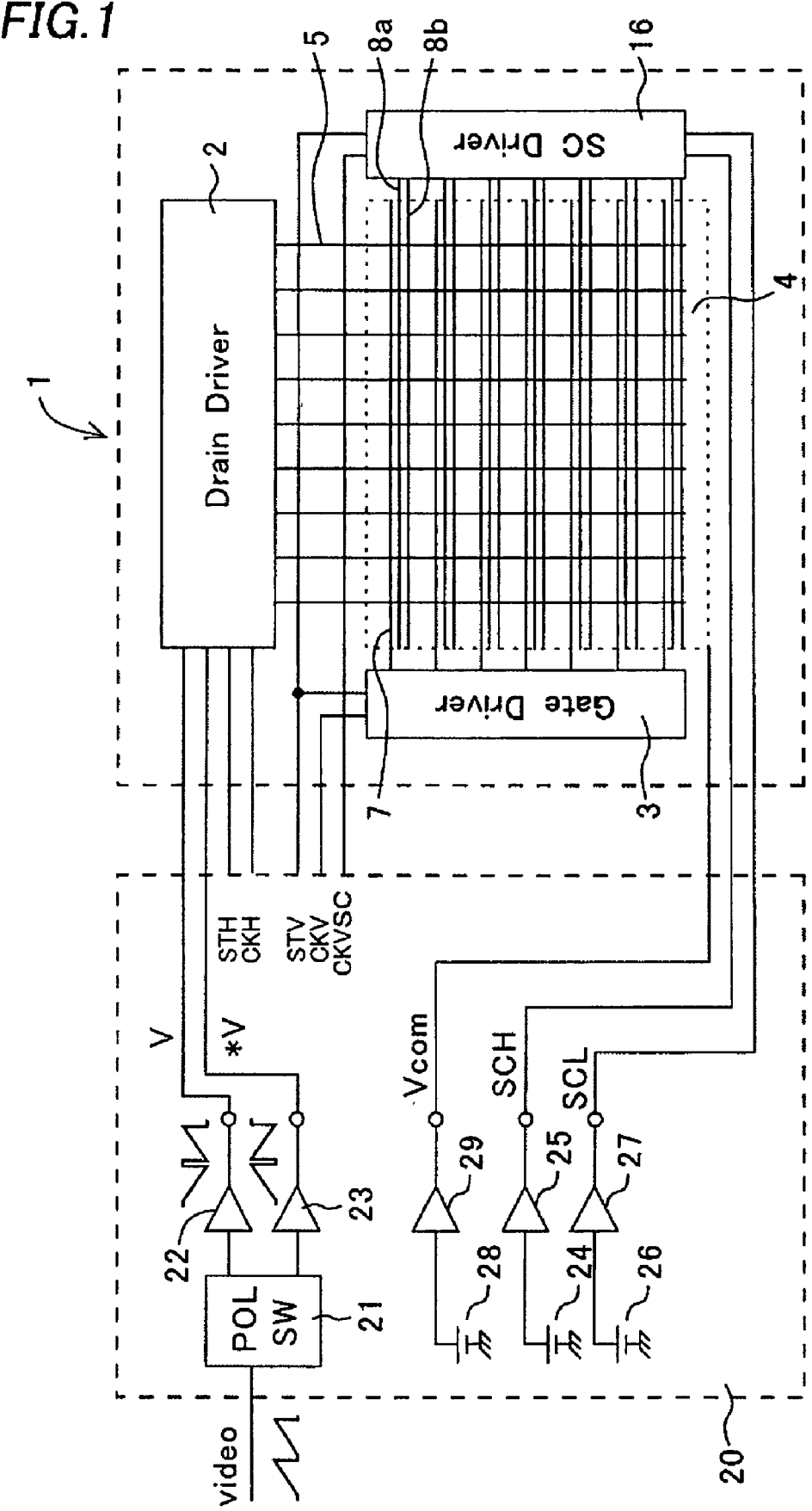
FIG. 1 is a circuit block chart of the active matrix display device of the first embodiment of this invention.
Figure 2:
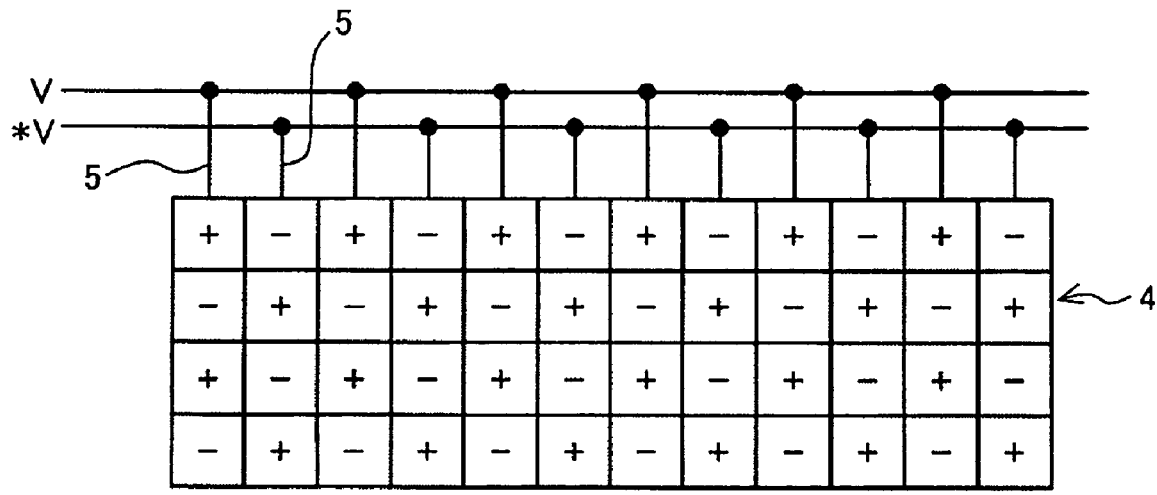
FIG. 2 is a model view of the pixel region of the display panel of the active matrix display device of the first embodiment of this invention.
Figure 3:
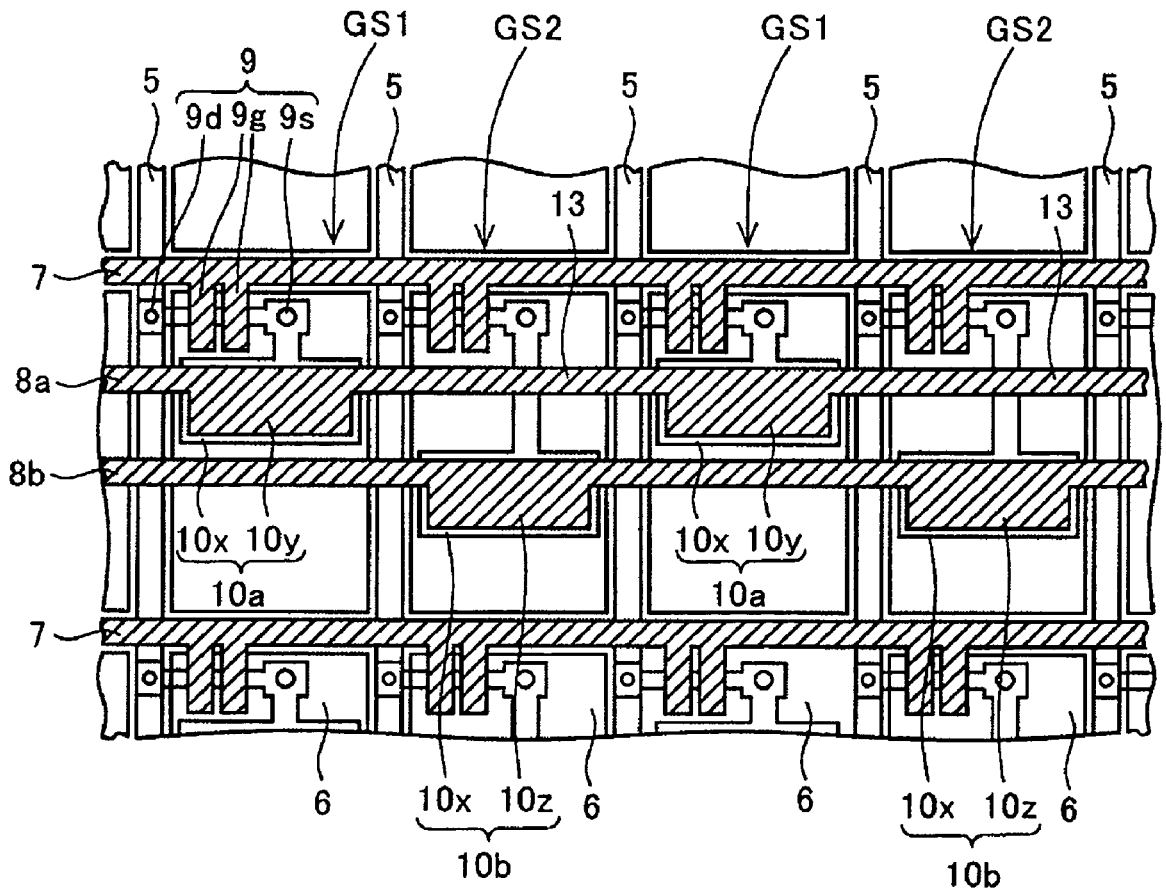
FIG. 3 is a pattern view of the display region of the display panel of the active matrix display device of the first embodiment of this invention.
Figure 4:
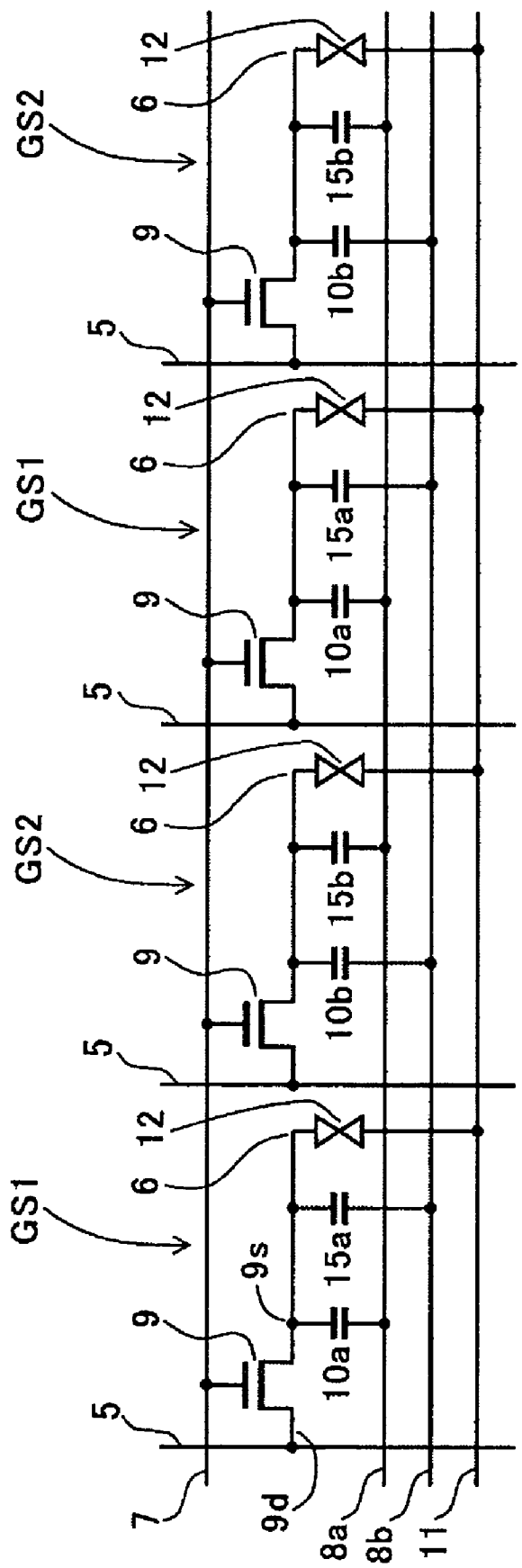
FIG. 4 is an equivalent circuit diagram of the display region shown in FIG. 2.

Next, the first embodiment of the active matrix display device of this invention will be explained by referring to the figures. FIG. 1 is a circuit block chart of the active matrix display device. FIG. 2 is a model view of the pixel region of the display panel of the active matrix display device. FIG. 3 is a pattern view of the display region of the display panel of the active matrix display device, and FIG. 4 is its equivalent circuit diagram.

A display panel 1 and a driving LSI 20 that supplies a driving signal to the display panel 1 are provided, as shown in FIG. 1. The configuration of the display panel 1 will be explained.

A drain driver 2 is disposed in row direction and a gate driver 3 is disposed in column direction on a display panel. A display region 4 for displaying image is disposed surrounded with the drain driver 2 and gate driver 3. A plurality of drain lines 5 and a plurality of rectangular pixel electrode with the longitudinal side in column direction are disposed in column direction and a gate line 7, a first supplemental capacitance line 8a and a second supplemental capacitance line 8b are disposed in row direction in the display region 4, as shown in FIGS. 3 and 4.

A TFT 9 and a first supplemental capacitance 10a or a second supplemental capacitance 10b are formed in the region with the pixel electrode 6 (referred to as "a pixel" hereinafter). That is, the first supplemental capacitance 10a is disposed in the first pixel GS1 and the second supplemental capacitance 10b is disposed in the second pixel GS2 adjacent to the first pixel GS1. The first pixel GS1 and the second pixel GS2 are alternatively formed in row direction.

The TFT 9 includes a gate electrode 9g extending from the gate line 7, a drain region 9d that is a semiconductor layer electrically connected to the drain line 5 through a contact, and a source region 9s that is a semiconductor layer electrically connected to the pixel electrode 6 through a contact. The first supplemental capacitance 10a includes a supplemental capacitance electrode 10x that is a semiconductor layer connected to the TFT 9 and a supplemental capacitance electrode 10y extending from the first supplemental capacitance line 8a and superimposing over the supplemental capacitance electrode 10x with a capacitance-insulating layer. The second supplemental capacitance 10b includes the supplemental capacitance electrode 10x mentioned above and a supplemental capacitance electrode 10z extending from the second supplemental capacitance line 8b and superimposing over the supplemental capacitance electrode 10x with a capacitance-insulating layer.

A first parasitic capacitance 15a is formed between the pixel electrode 6 and the second supplemental capacitance line 8b in the first pixel GS1, and a second parasitic capacitance 15b is formed between the pixel electrode 6 and the first supplemental capacitance line 8a in the second pixel GS2. A liquid crystal is sealed in between the substrate with the TFT 9 formed on it and the other substrate facing against the first substrate. A common electrode 11 is formed on the other substrate, forming a supplemental capacitance electrode corresponding to the pixel electrode 6 of a liquid crystal capacitance 12.

The driving LSI 20, which will be explained below, formed outside of the display panel 1 supplies the first video signal voltage V and the second video signal voltage *V with the polarities opposite to each other to the drain driver 2. The drain driver 2, then, consecutively selects the drain line 5, feeding either the first video signal voltage V or the second video signal voltage *V. The first video signal voltage V and the second video signal voltage *V have voltages with the polarities opposite to each other, the voltage of the common electrode 11 (referred to as the common electrode potential Vcom, hereinafter) being their the reference voltage.

That is, the drain driver 2 supplies the first video signal voltage V (indicated as "+" in FIG. 2) to the pixel electrode 6 of a pixel and supplies the second video signal *V (indicated as "−" in FIG. 2) with the opposite polarity from that of the first video signal voltage to the pixel electrode 6 of the pixel adjacent to the pixel with the first video signal voltage. In this way, any pair of the adjacent pixels in horizontal and vertical direction receives the video signal voltages with opposite polarities from each other.

The gate driver 3 consecutively selects the gate line 7 and applies the gate signal GV. The display region 4 is a region for image display with a plurality of pixel electrodes 6. The drain line 5 is the wiring for transmitting either the first video signal voltage V or the second video signal voltage *V that have the polarities opposite from each other to the TFT 9 through the contact. The pixel electrode 6, which is a display unit configuring the pixel region, is the electrode for driving the liquid crystal by the video signal voltages V, *V transmitted from the drain line 5 through TFT 9 together with the common electrode 11.

The gate line 7, selected by the gate driver 3 receives the gate signal GV, turning the TFT 9 on. The first supplemental capacitance line 8a is formed in the same layer as the layer of the gate line 7 together with the supplemental capacitance electrode 10y arranged in row direction, connecting the first supplemental capacitances 10a formed in each row. The second supplemental capacitance line 8b is formed in the same layer as the layer of the gate line 7 together with the supplemental capacitance electrode 10z arranged in row direction, connecting the second supplemental capacitances 10b formed in each row.

The first supplemental capacitance line 8a and the second supplemental capacitance line 8b receive a high potential SCH and a low potential SCL with the opposite polarities from a SC driver and the polarities are inverted with a predetermined timing. The SC driver includes a shift resistor and a signal supply circuit.

The TFT 9 is a switching element for letting the electric current go through a channel region, which is a semiconductor layer, located directly under the gate electrode 9g, either from the source region 9s to the drain region 9d or from the drain region 9d to the source region 9s only when the voltage is applied to the gate electrode 9g. The first supplemental capacitance 10a and the second supplemental capacitance 10b hold the electric load coming from the video signal voltages V and *V supplied from the drain line 5 through the TFT 9 for one frame period, supplementing the loss of electric load of the liquid crystal capacitance 12. The common electrode 11, with a certain amount of voltage applied drives the liquid crystal with the pixel electrode 6 according to the video signal voltages V and *V applied to the pixel electrode 6. The electric load of the liquid crystal capacitance 12 comes from the video signal voltages V, and *V supplied from the drain line 5 through the TFT 9 and held by the liquid crystal.

However, the electric charge held by the liquid crystal 12 easily leaks due to current leakage because of impurities in the liquid crystal while the TFT 9 is off. Therefore, the electric charge held in the first supplemental capacitance 10a and the second supplemental capacitance 10b supplements the electric load of the liquid crystal capacitance 12.

Next, the configuration of the driving LSI 20 provided outside of the display panel 1 will be explained. An analog video signal inputted from outside is processed into the first video signal voltage V and the second video signal voltage *V with the polarities opposite from that of the first video signal voltage through a polarity switching circuit 21. The polarities of the first video signal voltage V and the second video signal voltage *V are inverted for each horizontal period.

The first video signal voltage V and the second video signal voltage *V are outputted to a pair of signal wirings through an output buffer 22 and an output buffer 23 respectively, and then fed to the drain driver 2 of the display panel 1.

The reference numeral 24 denotes a potential source for generating the high potential SCH, which is outputted through a high potential buffer 25. The reference numeral 26 denotes a potential source for generating the low potential SCL, which is outputted through a low potential buffer 27. The High potential SCH and the low potential SCL are supplied to the SC driver 16.

The reference numeral 28 denotes a potential source for generating a common electrode potential Vcom, which is outputted through an output buffer 29. The high potential SCH and the low potential SCL outputted from the first and the second output buffers 25, 27 have the polarities opposite from that of the common electrode potential Vcom outputted from the output buffer 29. Since the high potential SCH, the low potential SCL and the common electrode potential Vcom are all DC potential, the energy consumption of the driving LSI 20 will be reduced.

The driving LSI 20 generates a horizontal start signal STH, a horizontal clock signal CKH, a vertical start signal STV, a vertical clock signal CKV, a SC driver controlling clock CKVS and other controlling clocks and supplies these signals to the display panel 1.

Figure 5:
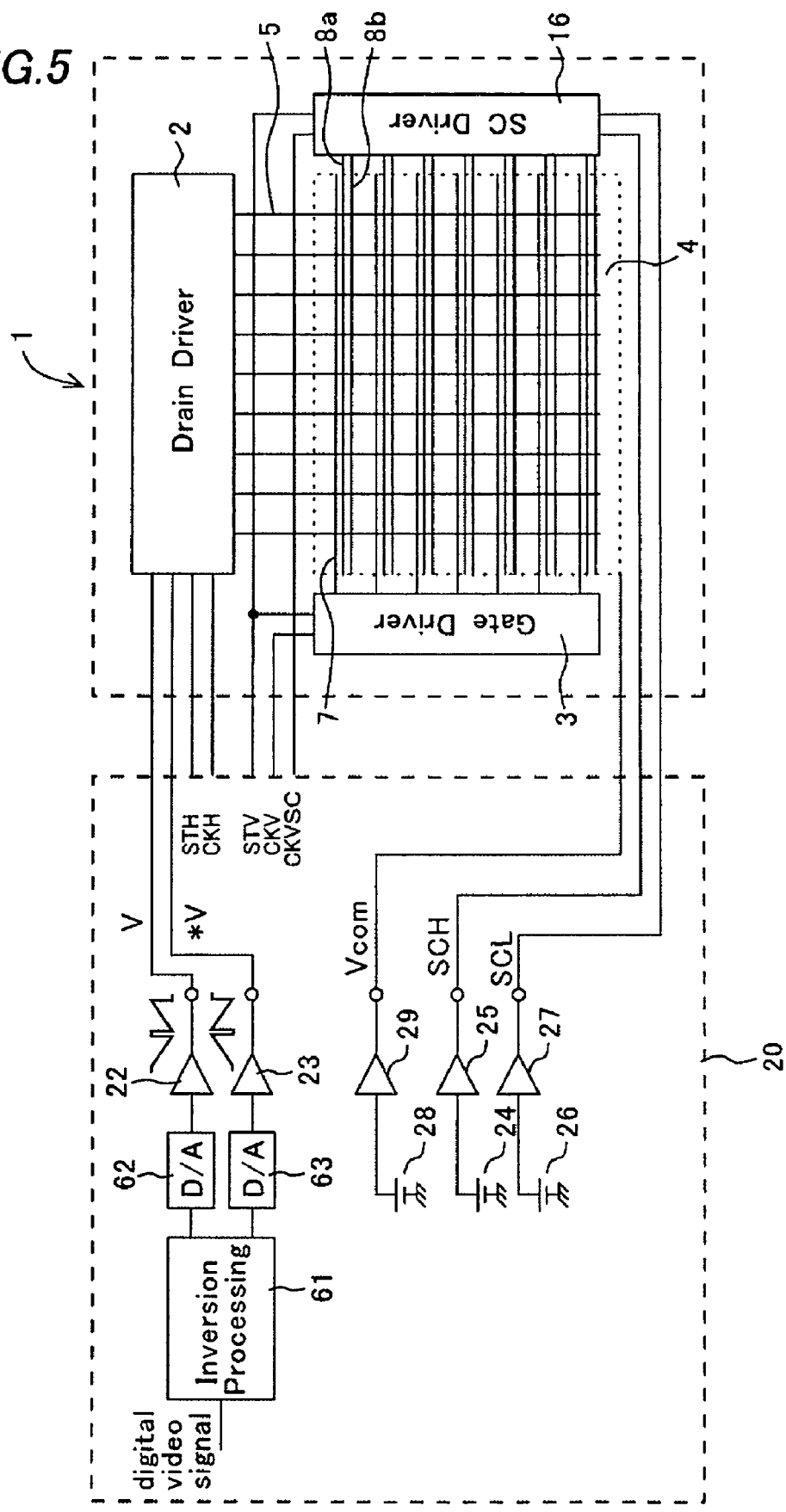
FIG. 5 is another circuit block chart of the active matrix display device of the first embodiment of this invention.

An analog video signal is inputted into the driving LSI 20 in the active matrix display device mentioned above. However, it is also possible to input a digital video signal and change it into an analog video signal. FIG. 5 shows a block circuit diagram of the active matrix display device with this configuration. A digital video signal inputted from outside is processed into a pair of digital video signals, whose polarities are inverted at each horizontal period, by an inversion processing circuit 61. The pair of the digital video signals is inputted into DA converters (digital analog converter) 62, 63 respectively, and inverted into analog video signals, a first video signal potential V and the second video signal potential*V with the opposite polarities.

The first video signal voltage V and the second video signal voltage *V are outputted to a pair of signal wirings through an output buffer 22 and an output buffer 23 respectively, and then fed to the drain driver 2 of the display panel 1. Other configuration is the same as that of the active matrix display device shown in FIG. 1.

Figure 6:
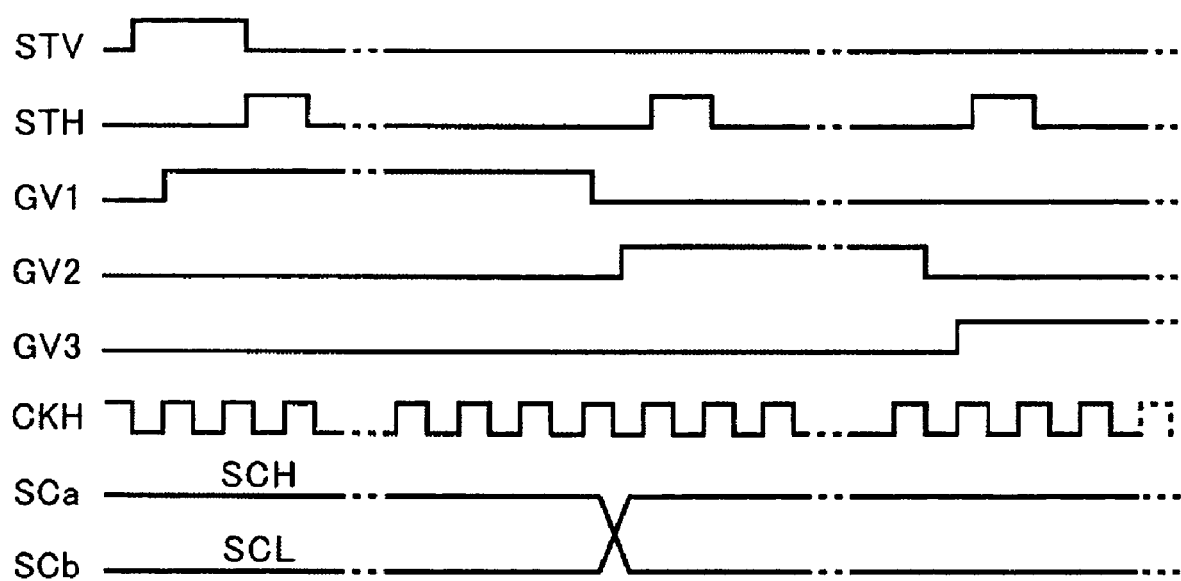
FIG. 6 is a timing chart showing the relation among the signals of the display panel of the active matrix display device of the first embodiment of this invention.

Next, the driving method of the active matrix display device mentioned above will be explained. FIG. 6 is a timing chart showing the relation among signals in the display panel. The chart shows the timing of the potential change of the vertical start signal STV, the gate signal GV, the horizontal start signal STH, the horizontal clock signal CKH, the potential SCa of the first supplemental capacitance line 8a and the potential SCb of the second supplemental capacitance line 8b.

First, the pulse of the gate signal GV1 starts up after the pulse of the vertical start signal STV starts up, turning on the TFT 9 connected to the gate line 7 in the first row which receives the gate signal GV1. Then, the pulse of the horizontal start signal STH starts up, and it is synchronized with the pulse of the horizontal clock signal CKH while the gate signal GV1 is supplied to the gate line 7 in the first row. The drain driver 2 consecutively selects the drain line 5 and the first and the second video signal voltages V, *V are consecutively applied to the pixel electrode 6, the first supplemental capacitance 10a, and the second supplemental capacitance 10b through the TFT 9.

The first video signal voltage V is fed to the pixel electrode 6 of the first pixel GS1, the first supplemental capacitance 10a and the first parasitic capacitance 15a. The second video signal voltage *V is fed to the pixel electrode 6 of the second pixel GS2, the second supplemental capacitance 10b and the first parasitic capacitance 15b.

The gate signal GV1 is not supplied to the gate line 7 on the first row, turning off the TFT 9 that is connected to the gate line 7 when the video signal voltage VD is fed to all the drain lines 5. Then, the pulse of the gate signal GV2 and gate signal GV3 consecutively get started, feeding the gate signal GV2 to the gate line 7 on the second row and the gate signal GV3 to the gate line 7 on the third row. This operation is repeated.

The polarity of the potential SCa of the first supplemental capacitance line 8a and the potential SCb of the second supplemental capacitance line 8b are inverted while the TFT 9 connected to the gate line 7 is off because the gate line 7 does not receive the gate signal GV. That is, the polarity is inverted for the period staring from the time when the gate signal GV1 gets halted to the time when the gate signal GV 2 gets started. The SC driver 16 controls the potential SCa of the first supplemental capacitance line 8a to change from the high potential SCH into low potential SCL and the potential SCb of the second supplemental capacitance line 8b to change from the low potential SCL into the high potential SCH. The inversion of the polarities between the potential SCa of the first supplemental capacitance line 8a and the potential SCb of the second supplemental capacitance line 8b takes place for each row with one frame circle.

The voltage of the pixel electrode 6 (refereed to as the pixel voltage Vp, hereinafter) changes either to the positive voltage direction or the negative voltage direction through its capacitance coupling with the first supplemental capacitance 10a and first parasitic capacitance 15a or the capacitance coupling with the second supplemental capacitance 1b and the second parasitic capacitance 15b, performing the dot inversion driving, based on the voltage change ΔVs of the supplemental capacitance line. Then, the pulse of the vertical start signal STV starts up again when the gate signal GV is fed to all the gate line 7, feeding the gate signal GV to the gate line 7 on the first row. The same operation is repeated.

Therefore, each pixel in the first row receives the video signals with the polarity of +−+−,,,, each pixel in the second row receives the video signals with the polarity of −+−+,,,, and each pixel in the third row receives the video signals with the polarity of +−+−,,,. This operation is repeated, performing the dot inversion driving.

Figure 7A:
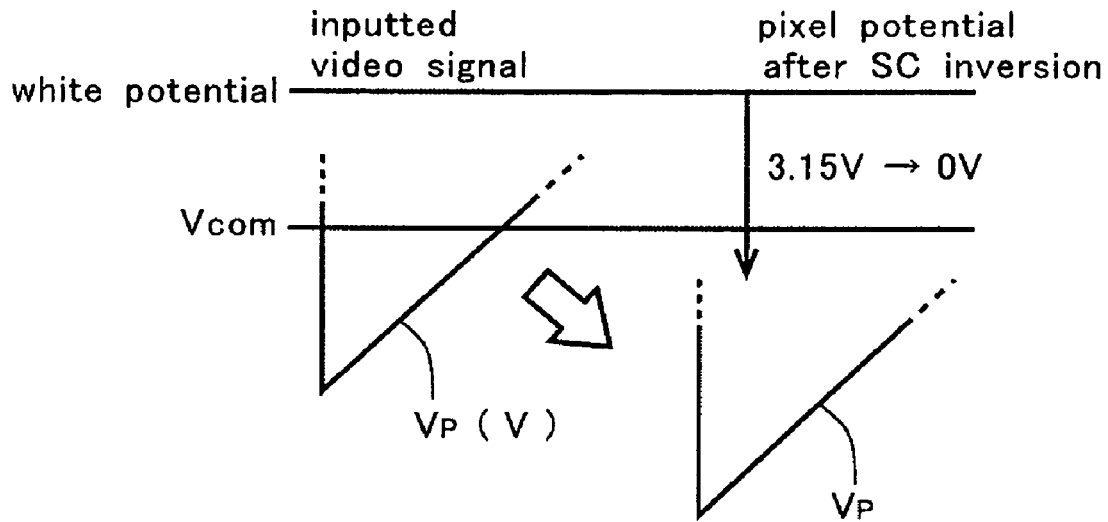
FIG. 7 is a waveform of the signal showing the driving method of the active matrix display device of the first embodiment of this invention.
Figure 7B:
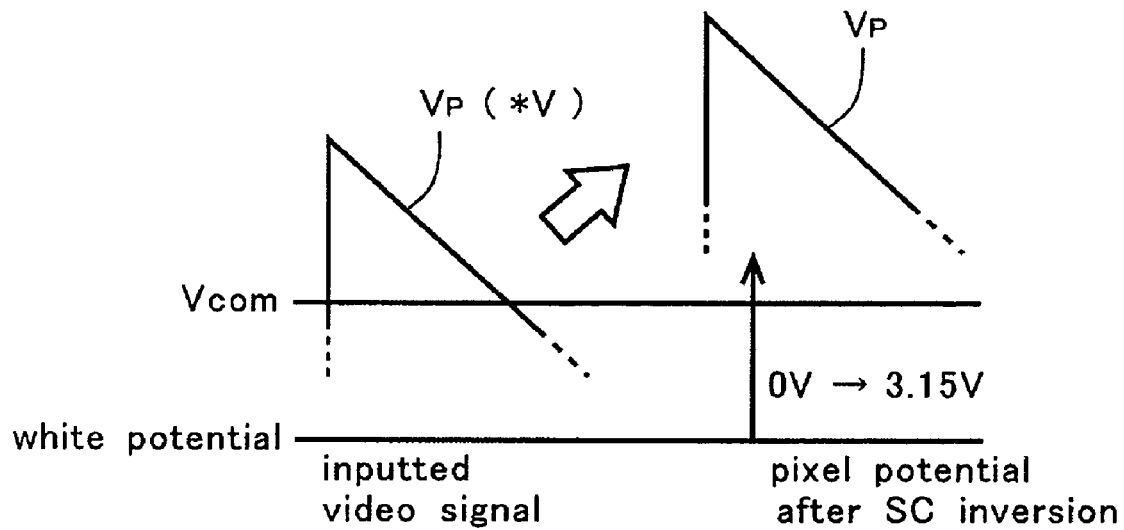

FIGS. 7A and 7B are the waveform showing the driving method of the display device of an embodiment of this invention. FIG. 7A shows the change of the pixel voltage Vp of the first pixel GS1 around the time when the polarity of the voltage SCa of the first supplemental capacitance line 8a is inverted. FIG. 7B shows the change of the pixel voltage Vp of the second pixel GS2 around the time when the polarity of the voltage SCb of the second supplemental capacitance line 8b is inverted.

It shows that the voltage SCa of the first supplemental capacitance line 8a is inverted from 3.15V to 0V and the voltage SCb of the second supplemental capacitance line 8b is inverted from 0V to 3.15V after the gate signal GV1 drops down to low level.

The pixel voltage Vp of the first pixel GS1 changes in negative voltage direction against the stable voltage Vcom of the common electrode 11 and the pixel voltage Vp of the second pixel electrode GS2 changes in positive voltage direction against the stable voltage Vcom of the common electrode 11 through the capacitance coupling mentioned above according to the voltage change ΔVsc.

Figure 8:
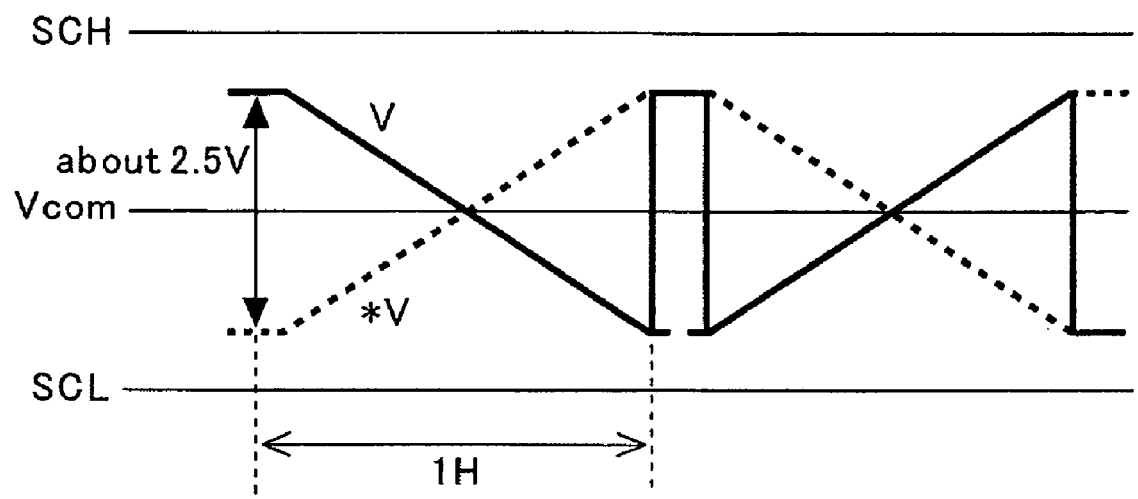
FIG. 8 is a waveform of the signal showing the driving method of the active matrix display device of the first embodiment of this invention.
Figure 9:
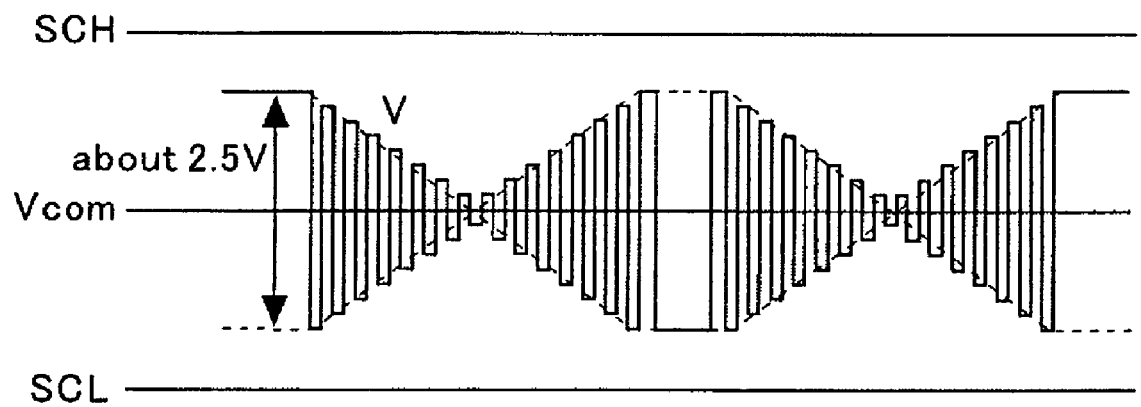
FIG. 9 is a waveform of the signal showing the driving method of the active matrix display device of the prior art.

The active matrix display device of this embodiment described above can improve the quality of image by performing the dot inversion driving. Additionally, since the video signal is not a single-phased signal, but a double-phased signal with the first and second video signal voltages V and *V, it is possible to make the inversion circle one horizontal period (1H period), leading to the smaller electric load to the driving LSI 20 and the reduction of the energy consumption, as shown in FIG. 8. If the video signal is a single-phased signal, the video signal should be inverted at a high speed within one horizontal period for each pixel (for each dot) in order to make the dot inversion driving possible, as shown in FIG. 9, leading to the larger energy consumption by the driving LSI 20.

The dynamic range of the compound signal of the first and the second video signal voltages V, *V is the same dynamic range of each of the first and second video signal voltages V, *V (for example, about 2.5V) in this embodiment, as shown in FIG. 7, leading to the further reduction of the energy consumption by the driving LSI 20. Additionally, it is possible to further reduce the energy consumption if the dynamic range of the composite signal of the first and the second video signal voltages V, *V is smaller than the sum of the dynamic range of the first and second video signal voltages V, *V.

The double-phased video signal with the first and the second video signal voltages V, *V is fed to the display panel 1 in this embodiment, the video signal voltage of any even-numbered phase, such as the video signal voltage with four phases, six phases or eight phases can also be generated in the driving LSI 20 and fed to the display panel 1. For example, the first and the third video signal voltages V1 and V3 has the same polarity and the second and the fourth video signal voltages V2 and V4 has the polarity opposite from that of the first and the third video signal voltages, when the video signal with four phases is generated. The video signals V1, V2, V3, and V4 are fed in this order to each of the pixels, achieving the low energy-consumption dot inversion driving.

Figure 10:
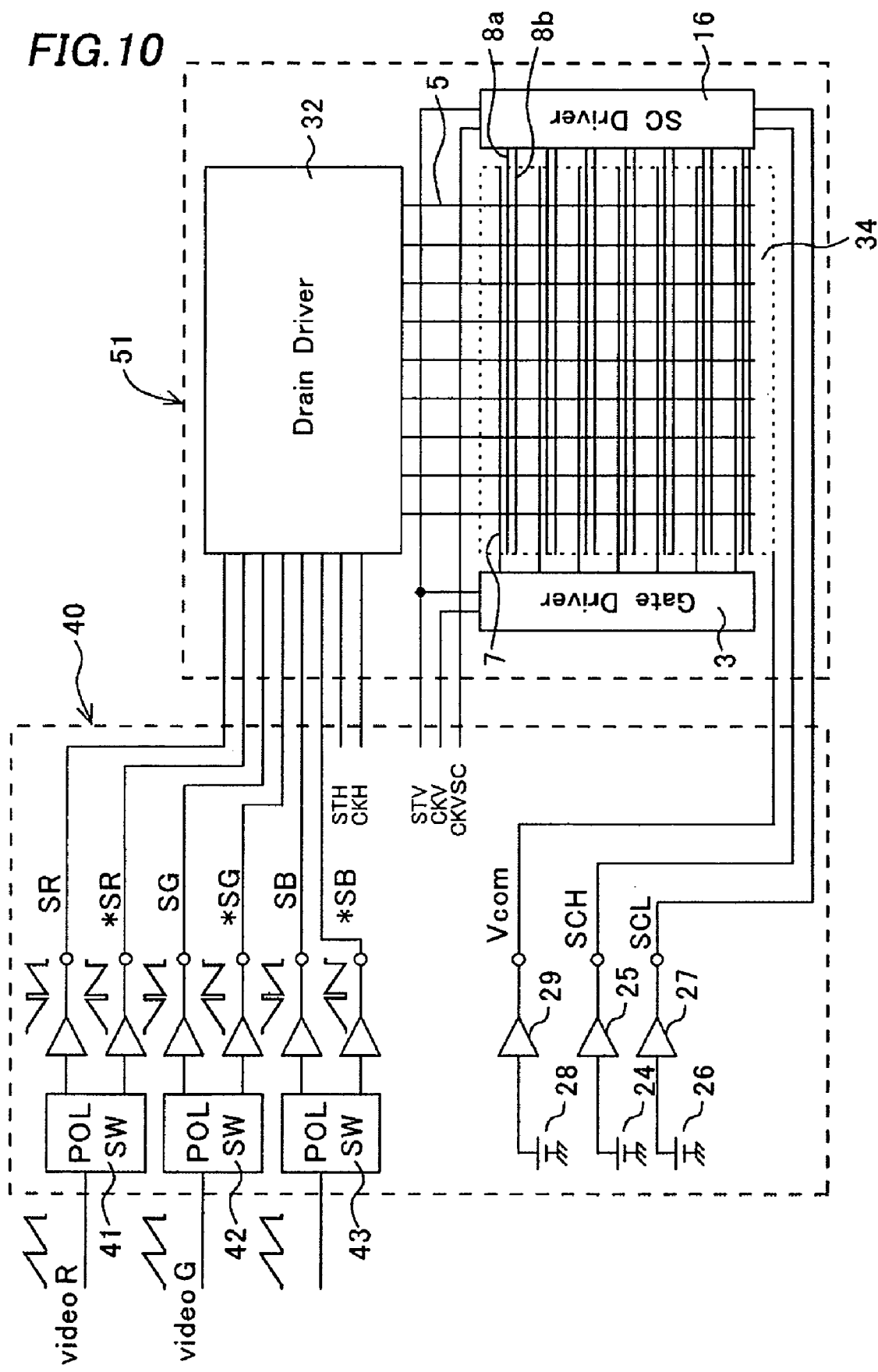
FIG. 10 is a circuit block chart of the active matrix display device of the second embodiment of this invention.
Figure 11:
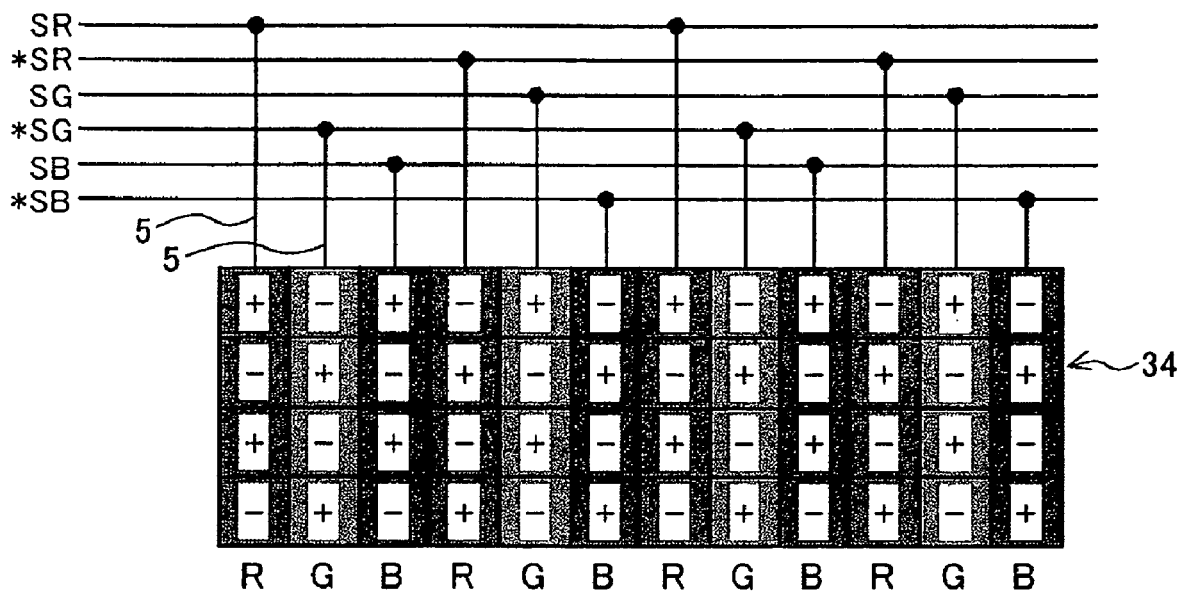
FIG. 11 is a model view of the pixel region of the display panel of the active matrix display device of the second embodiment of this invention.
Figure 12:
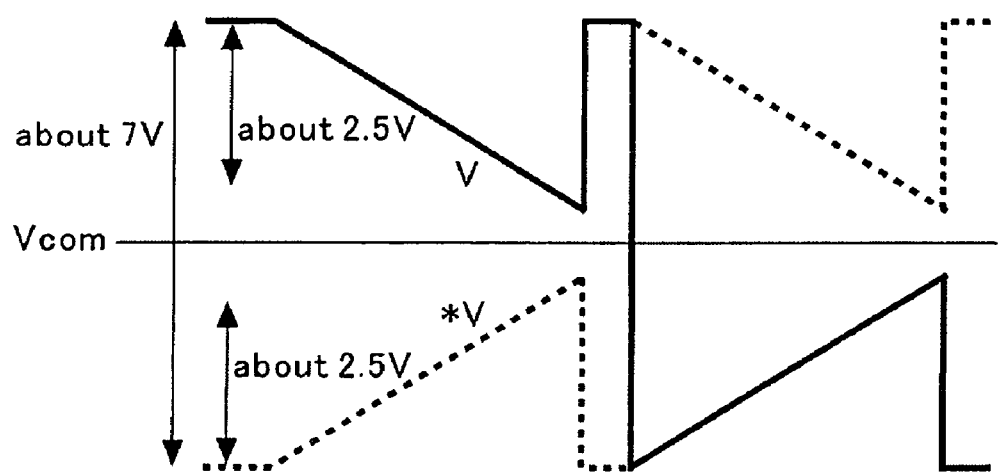
FIG. 12 is a waveform of the signal showing the driving method of the active matrix display device of the prior art.

Next, the second embodiment of the active matrix display device of this invention will be explained by referring to the figures. FIG. 10 is a circuit block chart of the active matrix display device. And FIG. 11 is a model view of the pixel region of the display panel of the active matrix display device of this invention.

The first embodiment relates to the active matrix display device with black and white display. However, the active matrix display device of the second embodiment of this invention is a multiple-color display.

The video signals with three primary colors, RGB are supplied to the driving LSI 40 in this active matrix display device. Polarity switching circuits 41, 42, 43 corresponding to the video signals with three primary colors, RGB, and a pair of output buffers to amplify the output of the switching elements are formed in the driving LSI 40.

The video signal voltage SR and the video signal voltage *SR with the polarity opposite from that of the video signal RS are acquired as to the red color. Likewise, the video signal voltage SG and the video signal voltage *SG with the polarity opposite from that of the video signal SG are acquired as to the green color, and the video signal voltage SB and the video signal voltage *SB with the polarity opposite from that of the video signal SB are acquired as to the blue color. That is, the video signal with two phases that has the opposite polarities with the common electrode voltage Vcom as the reference voltage is generated for each color.

These video signal voltages are fed to a drain driver 32 of a display panel 51 through 6 signal wirings. Pixels corresponding to three primary colors, RGB, are formed in the order of R, G, and B in a display region 34 of the display panel 51 as shown in FIG. 10. The drain driver 32 applies the video signal voltages SR and *SR to the pixels in such way that the red pixels adjacent to each other receive the video signal voltages with the opposite polarities. Likewise, the drain driver 32 applies the video signal voltages SR and *SR to the pixels in such way that the green pixels adjacent to each other receive the video signal voltages with the opposite polarities, and video signal voltages SB and *SB to the pixels in such way that the blue pixels adjacent to each other receive the video signal voltages with the opposite polarities.

The dot inversion driving can be achieved in this way in the full-color active matrix display device. Since the video signals corresponding to each color has the inversion circle of one horizontal period, as in the first embodiment, it is possible to make the electric load of the driving LSI 40 smaller, leading to the reduced energy consumption. Also, the dynamic range of the video signals corresponding to each color is set narrower, as in the first embodiment, the smaller load of the driving LSI 40 is achieved, leading to the further reduction of the energy consumption.

The first and the second embodiments of this invention can achieve the high quality active matrix display device that is capable of both the line inversion driving with the low energy consumption and the dot inversion driving with high quality display.

The driving LSIs 20, 40 are formed outside the display panels 1, 51 respectively in the first and the second embodiments. However, it is also possible to form the driving LSIs 20, 40 within the display panels 1, 51, respectively. The TFT is used as the switching element for each pixel. The TFT can be poly-silicon TFT or amorphous TFT. It is also possible to use TFD (thin film diode) instead of TFT, as a switching element.

What is claimed is:

1. An active matrix display device comprising:
   a plurality of a first pixel electrodes arranged in a row that is scanned in a horizontal scanning period of the active matrix display device;
   a plurality of a second pixel electrodes arranged in the row, each of the second pixel electrodes being disposed adjacent a corresponding first pixel electrode;
   a signal processing circuit outputting a composite video signal comprising a first video signal and a second video signal that has a polarity opposite from a polarity of the first video signal, a dynamic range of the composite video signal not being larger than a sum of a dynamic range of the first video signal and a dynamic range of the second video signal;
   a driver circuit supplying the first video signal to the first pixel electrodes and the second video signal to the second pixel electrodes so that the first video signal inverts for each horizontal scanning period with respect to a reference voltage and the second video signal inverts for each horizontal scanning period with respect to the reference voltage; and
   a supplemental capacitance electrode provided for each of the first and second pixel electrodes, a first supplemental capacitance line provided so as to form capacitance between the first supplemental capacitance line and the supplemental capacitance electrodes provided for the first pixel electrodes, and a second supplemental capacitance line provided so as to form capacitance between the second supplemental capacitance line and the supplemental capacitance electrodes provided for the second pixel electrodes,
   wherein the first supplemental capacitance line does not form capacitance with the supplemental capacitance electrodes provided for the second pixel electrodes, and the second supplemental capacitance line does not form capacitance with the supplemental capacitance electrodes provided for the first pixel electrodes.

2. The active matrix display device of claim 1, wherein the dynamic range of the composite video signal is the sum of the dynamic range of the first video signal and the dynamic range of the second video signal.

3. The active matrix display device of claim 1, wherein the polarities are determined with respect to a DC voltage applied to a common electrode facing the first and second pixel electrodes.

4. The active matrix display device of claim 1, wherein the second video signal is an inverted first video signal.

* * * * *